US008180412B2

(12) United States Patent
Wong et al.

(10) Patent No.: US 8,180,412 B2
(45) Date of Patent: May 15, 2012

(54) MOBILE WIRELESS COMMUNICATIONS DEVICE HAVING FREQUENCY SELECTIVE GROUNDING AND RELATED METHOD

(75) Inventors: Joshua Kwan Ho Wong, Waterloo (CA); Adrian M. Cooke, Kitchener (CA)

(73) Assignee: Research In Motion Limited, Waterloo, Ontario (CA)

( * ) Notice: Subject to any disclaimer, the term of this patent is extended or adjusted under 35 U.S.C. 154(b) by 58 days.

(21) Appl. No.: 12/868,763

(22) Filed: Aug. 26, 2010

(65) Prior Publication Data

US 2012/0052916 A1 Mar. 1, 2012

(51) Int. Cl.
*H04M 1/00* (2006.01)

(52) U.S. Cl. .................. 455/575.1; 455/114.1; 455/347; 455/550.1

(58) Field of Classification Search ............... 455/575.1, 455/550.1; 361/56

See application file for complete search history.

(56) References Cited

U.S. PATENT DOCUMENTS

| 2004/0203488 A1* | 10/2004 | Sullivan et al. ............. 455/90.1 |
| 2005/0243486 A1 | 11/2005 | Wingfield et al. ............. 361/56 |
| 2006/0038635 A1* | 2/2006 | Richiuso et al. ............. 333/177 |
| 2009/0256758 A1 | 10/2009 | Schlub et al. ................ 343/702 |
| 2010/0090921 A1 | 4/2010 | Kim et al. .................... 343/848 |
| 2010/0194647 A1 | 8/2010 | Man et al. .................... 343/702 |

FOREIGN PATENT DOCUMENTS

| JP | 11-355022 | 12/1999 |
| JP | 2010-122525 | 6/2010 |
| WO | 2008/078144 | 7/2008 |

* cited by examiner

*Primary Examiner* — Vladimir Magloire
*Assistant Examiner* — Gerald Johnson
(74) *Attorney, Agent, or Firm* — Allen, Dyer, Doppelt, Milbrath & Gilchrist, P.A.

(57) ABSTRACT

A mobile wireless communications device includes a portable housing having a metallic front housing forming a peripheral sidewall as a metallic ring. A circuit board is carried by the portable housing and forms a chassis ground plane. A wireless communications circuit is carried by a circuit board. An antenna circuit is carried by a circuit board and connected to the wireless communications circuit. A frequency selective grounding circuit is positioned at a selected grounding location at the chassis ground plane and metallic front housing and forms a harmonic trap that responds to a specific range of frequencies.

24 Claims, 13 Drawing Sheets

FRONT HOUSING

MOBILE WIRELESS COMMUNICATIONS DEVICE HAVING FREQUENCY SELECTIVE GROUNDING AND RELATED METHOD

TECHNICAL FIELD

The present disclosure generally relates to the field of wireless communications systems, and more particularly, to mobile wireless communications device and related methods.

BACKGROUND

Mobile wireless communications systems continue to grow in popularity and have become an integral part of both personal and business communications. For example, mobile wireless communications devices, such as cellular telephones, allow users to place and receive voice calls most anywhere they travel. Moreover, as this telephone technology has increased, so too has the functionality of these devices and the different types of devices available to users. For example, many mobile wireless communications devices now incorporate personal digital assistant (PDA) features such as calendars, address books, task lists, etc. Moreover, such multi-function devices may also allow users to send and receive electronic mail (email) messages wirelessly and access the Internet via a cellular network and/or a wireless local area network (WLAN), for example.

Even so, as the functionality of these types of communications devices continues to increase, so too does the demand for smaller devices which are easier and more convenient for users to carry. One challenge this poses for cellular device manufacturers is designing housings and antennas that provide desired operating characteristics and grounding capability within the relatively limited amount of space available for various components.

BRIEF DESCRIPTION OF THE DRAWINGS

Other objects, features and advantages will become apparent from the detailed description which follows, when considered in light of the accompanying drawings in which.

DETAILED DESCRIPTION

The present description is made with reference to the accompanying drawings, in which exemplary embodiments are shown. However, many different embodiments may be used, and thus the description should not be construed as limited to the embodiments set forth herein. Rather, these embodiments are provided so that this disclosure will be thorough and complete. Like numbers refer to like elements throughout, and prime notation is used to indicate similar elements in alternative embodiments.

A mobile wireless communications device includes a portable housing having a metallic front housing forming a peripheral sidewall as a metallic ring. At least one circuit board is carried by the portable housing and forms a chassis ground plane. A wireless communications circuit is carried by a circuit board. An antenna circuit is carried by a circuit board and connected to the wireless communications circuit. A frequency selective grounding circuit is positioned at a selected grounding location at the chassis ground plane and metallic front housing and forms a harmonic trap that responds to a specific range of frequencies.

A respective frequency selective grounding circuit in an example operates at a specific range of frequencies. In another example, a respective frequency selective grounding circuit is formed from at least one of a series resonator and parallel resonator having a value depending on bandwidth requirements. The series resonator resonates at high frequencies in one example. A grounding location is specific to the frequency of operation and in another example, the frequency selective grounding circuit has a programmable frequency response for grounding. This frequency selective grounding circuit is formed as a variable matching device in an example.

In another example, the antenna is formed as a planar inverted F antenna (PIFA). The wireless communications circuit is formed as a cellular communications circuit in another example. The device further includes a display and user input device both carried by the portable housing and connected to the wireless communications circuit.

In another example, the frequency selective grounding circuit forms a harmonic trap that responds to a specific range of frequencies and formed as a variable matching device in which the frequency response of a grounding is programmed to operate at a specific range of frequencies. The variable matching device is also configured to change the impedance at a grounding location that is specific to the frequency of operation in an example.

A method aspect is also set forth.

Figure 1:
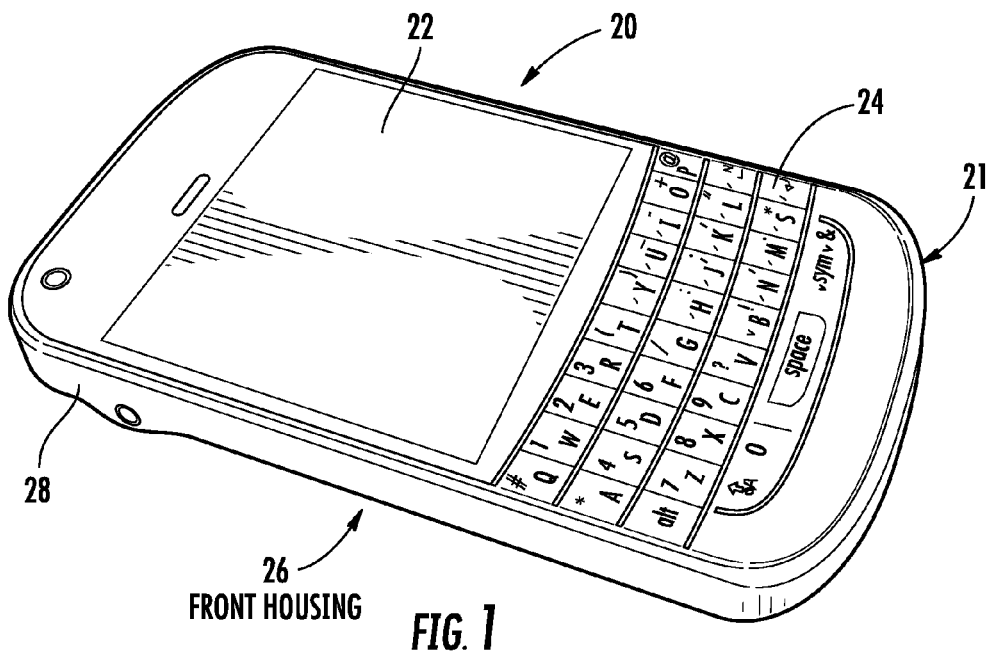
FIG. 1 is a perspective view of a mobile wireless communications device that includes a portable housing having a metallic front housing forming a peripheral side wall as a metallic ring.

The current trend in industrial design demands increasing use of metallic materials in a mobile wireless communications device such as a handheld device. This proposes a significant challenge to antenna designers because any introduction of metal in the portable wireless communications device such as a cellular phone usually has a detrimental impact on antenna performance. FIG. 1 shows a portable wireless communications device 20 having a portable housing 21, a display 22, and keyboard 24 and front housing 26 forming a peripheral sidewall as a ring 28. Measurements indicate that changing the front housing material from plastic to metal will harm the antenna performance in the Digital Communications System (DCS), Personal Communications Service (PCS) and Wideband Code Division Multiple Access (WCDMA) band one. This situation is made worse because the metallic front housing forms a peripheral sidewall as a metallic ring 28 and surrounds every antenna in the device in one non-limiting device example. Thus, the metallic ring formed as a peripheral sidewall overlaps every antenna. One technique to overcome the impact of the metallic front housing is to connect the metallic front housing to system ground in such a manner that it appears to be electromagnetically the same as the main printed circuit board. A number of manufacturers take this approach and this is achieved by grounding the portable housing at enough locations such that it behaves as part of the main printed circuit board.

There are drawbacks to this approach because this solution typically works only if the vertical sidewalls of the housing do not overlap the antennas, which is not the case in some portable wireless communications device such as the example that is shown in FIG. 1. Grounding locations also must work for different bands of operation. With a modern portable wireless communications device providing as many as ten bands or more, it is difficult to maintain good radiation performance because each band will require specific grounding locations that are not ideal for another band. For example, a location that provides good radiation performance for GSM580 mobile operation may be detrimental to DCS as another example. Also, the mechanical and ID constraints may prevent grounding at certain critical locations. Grounding takes up the printed circuit board real estate and a device may only allow a limited number of grounding locations.

In a non-limiting example, this problem is solved in which the groundings of the metallic front housing are frequency selective. A frequency selective grounding circuit is positioned at selected grounding locations and forms a harmonic trap that responds to a specific range of frequencies. In one example, each grounding location works for a specific range of frequencies that can be determined by design. To achieve frequency selectivity, the grounding makes use of either a series or parallel resonator depending on the bandwidth requirements and forms a harmonic trap.

Figure 2:
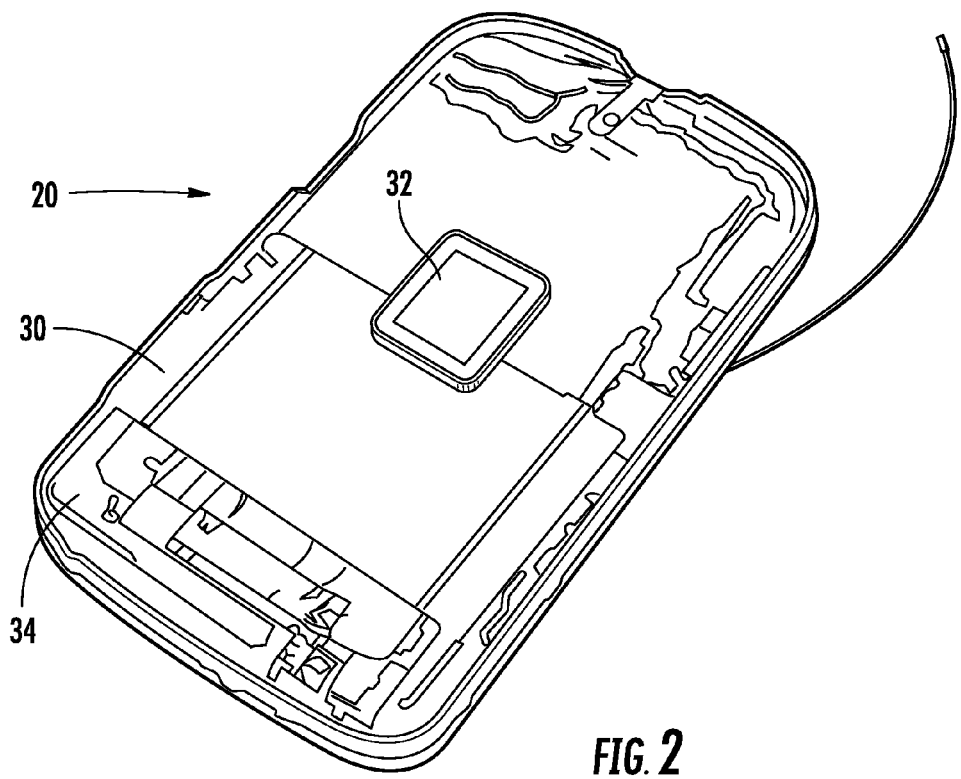
FIG. 2 is another perspective view similar to that shown in FIG. 1, but showing a housing cover removed and showing a circuit board that forms a chassis ground plane and showing an antenna structure situated thereon.

FIG. 2 shows an example of a portable wireless communications device 20 formed as a mobile handheld device that includes a circuit board 30 carried by the portable housing 21 and forming a chassis ground plane by means of the outermost surface of the PCB. A wireless communications circuit 32 is carried by the circuit board and in one example is typically enclosed within a container or "can" on the board. An antenna circuit 34 is carried by the circuit board and connected to the wireless communications circuit and in this example is formed as a planar inverted F antenna (PIFA). The portable housing 21 has a metallic front housing 26 forming a peripheral sidewall as a metallic ring 28 as illustrated and also shown in FIG. 1.

Figure 3A:
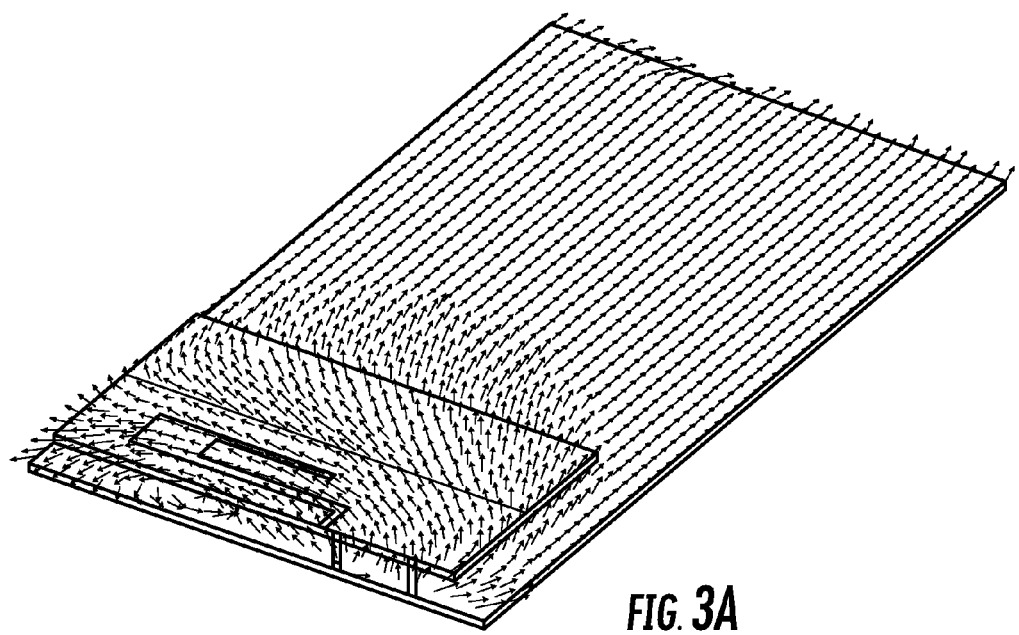
FIGS. 3A and 3B are views of a finite element analysis of a computed vector current density on the surface of the chassis at respective low frequency and high frequency when there is no metallic ring.
Figure 3B:
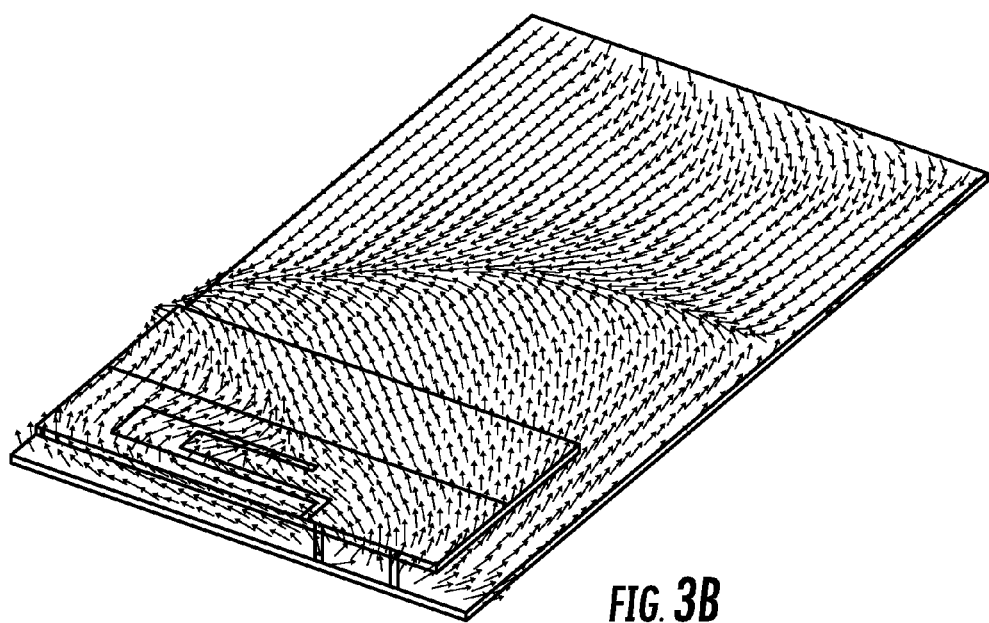

In the absence of the metallic ring, the current will flow in the chassis as part of the circuit board as shown in FIG. 3A at low frequency and shown in FIG. 3B as high frequency. Those figures illustrate the finite element analysis of the computed vector current density on the surface of the chassis formed by the outer surface of the board in this non-limiting example. At low frequency, the current flows uniformly on the chassis and the system behaves similar to a dipole antenna. At high frequency, a dominant current flow is observed along the shorter edge of the chassis. Furthermore, a null is seen along the middle of the chassis.

Figure 4A:
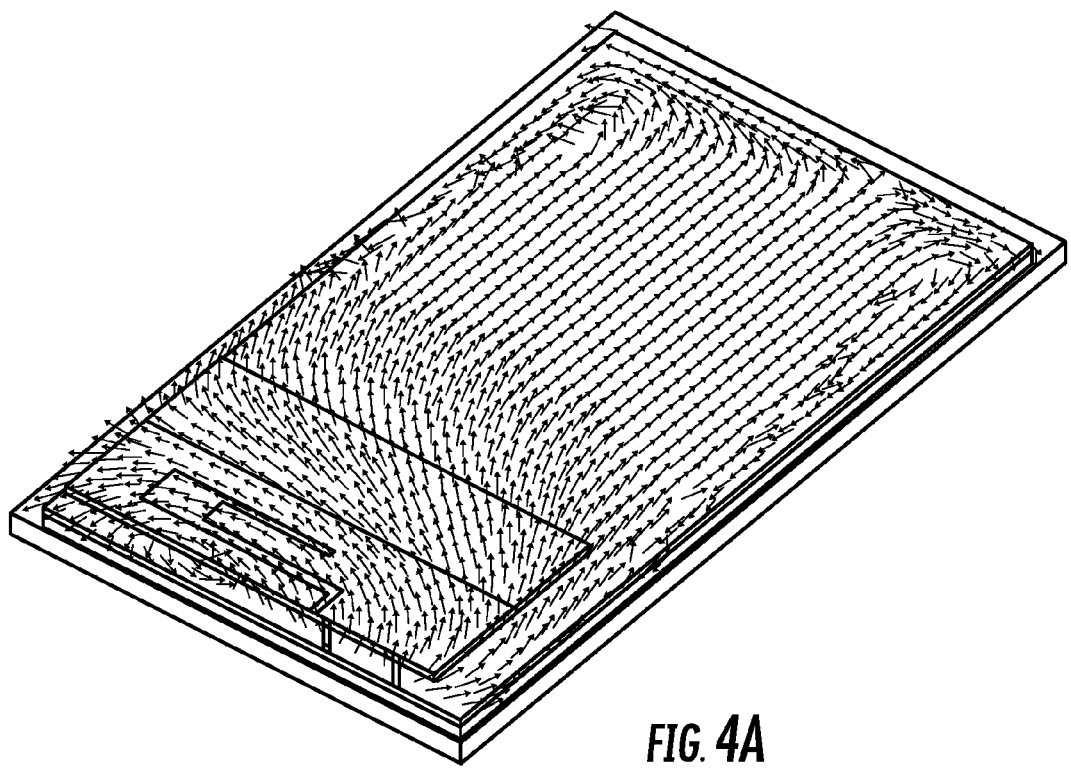
FIGS. 4A and 4B are views of a finite element analysis of the computed vector current density at the surface of the chassis when surrounded by a "floating," i.e., electromagnetically isolated, metallic ring at respective low frequency and high frequency.
Figure 4B:
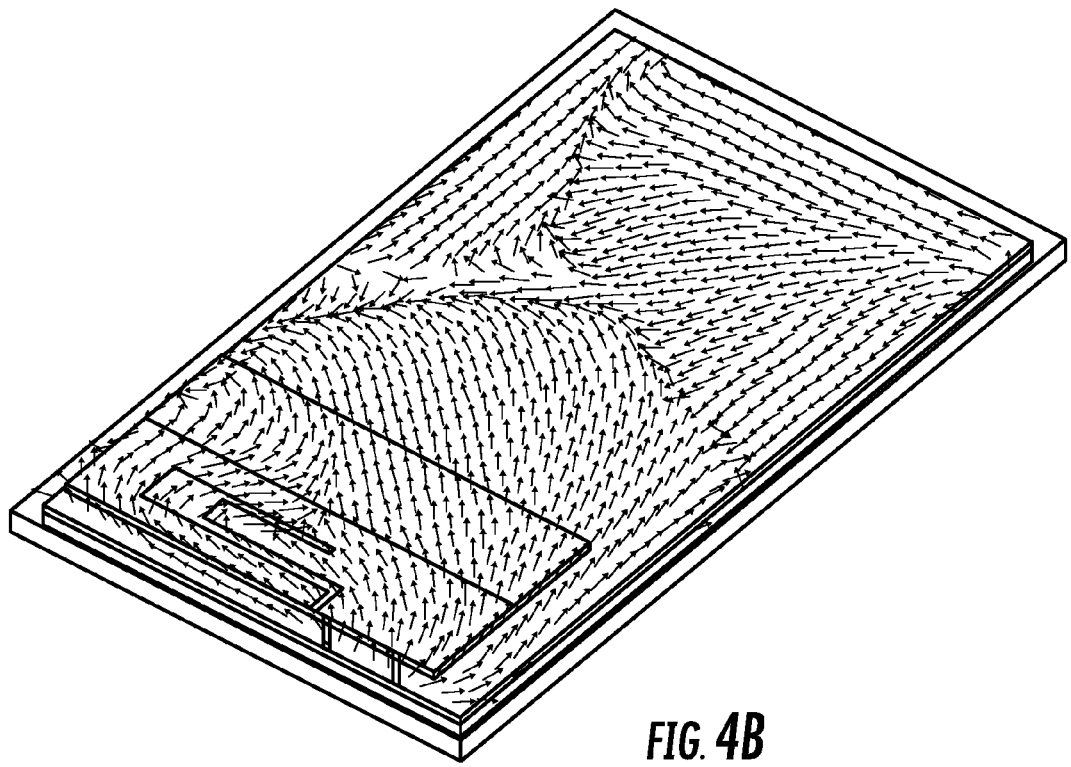

When the metallic front housing is used and forms the peripheral sidewall as a metallic ring and inserted around the chassis, there is significant disruption to the current flow. An example of that structure is seen in FIGS. 1 and 2 and described above. As shown in FIGS. 4A and 4B, the presence of the metallic ring causes erratic changes in the current flow, where the currents flow in opposite direction along the edges. When the current flow changes direction over short distances, the radiated fields will experience a destructive interference. FIG. 4A shows an example at low frequency and FIG. 4B shows an example at high frequency. These figures in FIGS. 4A and 4B illustrate the finite element analysis of the computed vector current density at the surface of the chassis when surrounded by a floating metallic ring.

Figure 5:
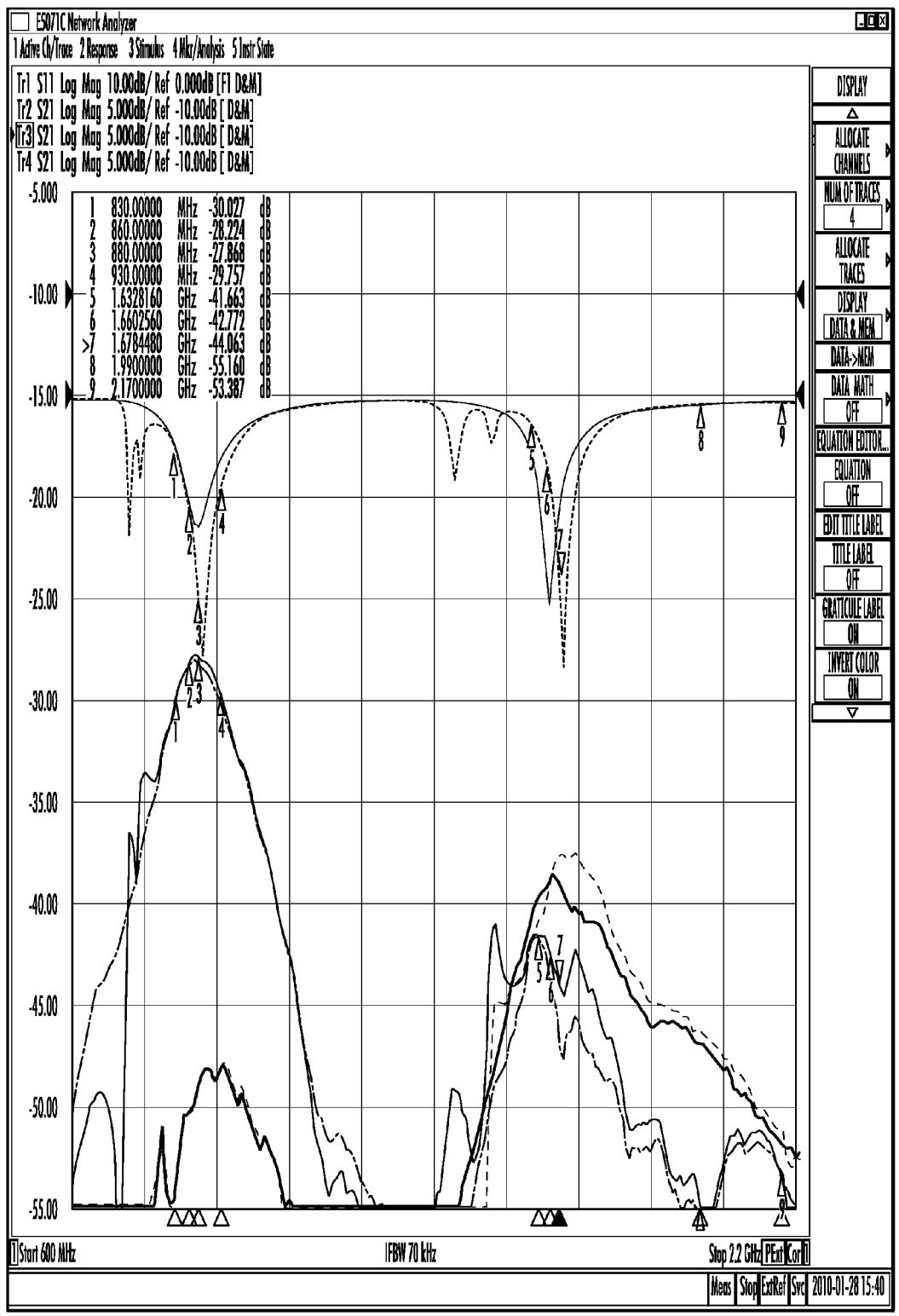
FIG. 5 is a graph showing the measured return loss and transmission of the communications device with a "floating" ground ring.

The destructive interference is shown in the graph of FIG. 5 and showing the measured return loss and transmission of the antenna. The valleys in the return loss plot show the resonant frequencies of the portable wireless communications device. It can be seen from the S21 plot that not all resonant frequencies radiate. These resonances are called destructive resonances.

Figure 6:
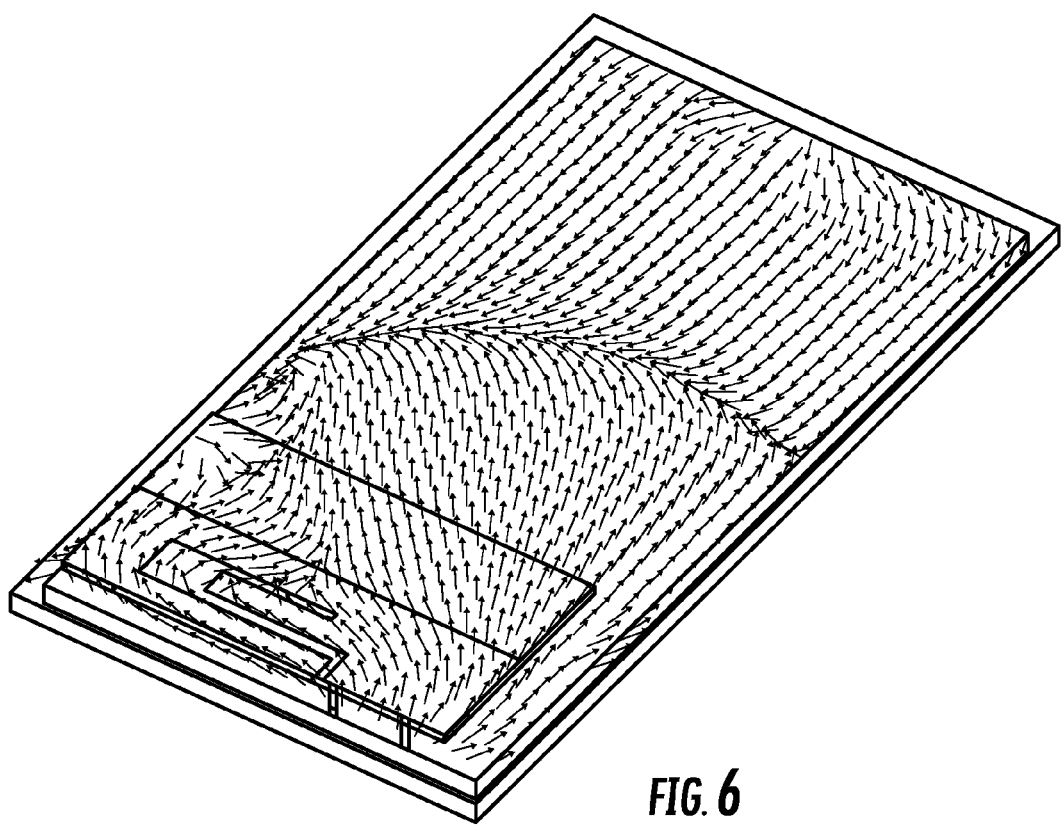
FIG. 6 is a view of a finite element analysis and showing the computed vector current density on the chassis when the metallic ring is grounded at three locations using the frequency selective grounding circuit in accordance with a non-limiting example.
Figure 7:
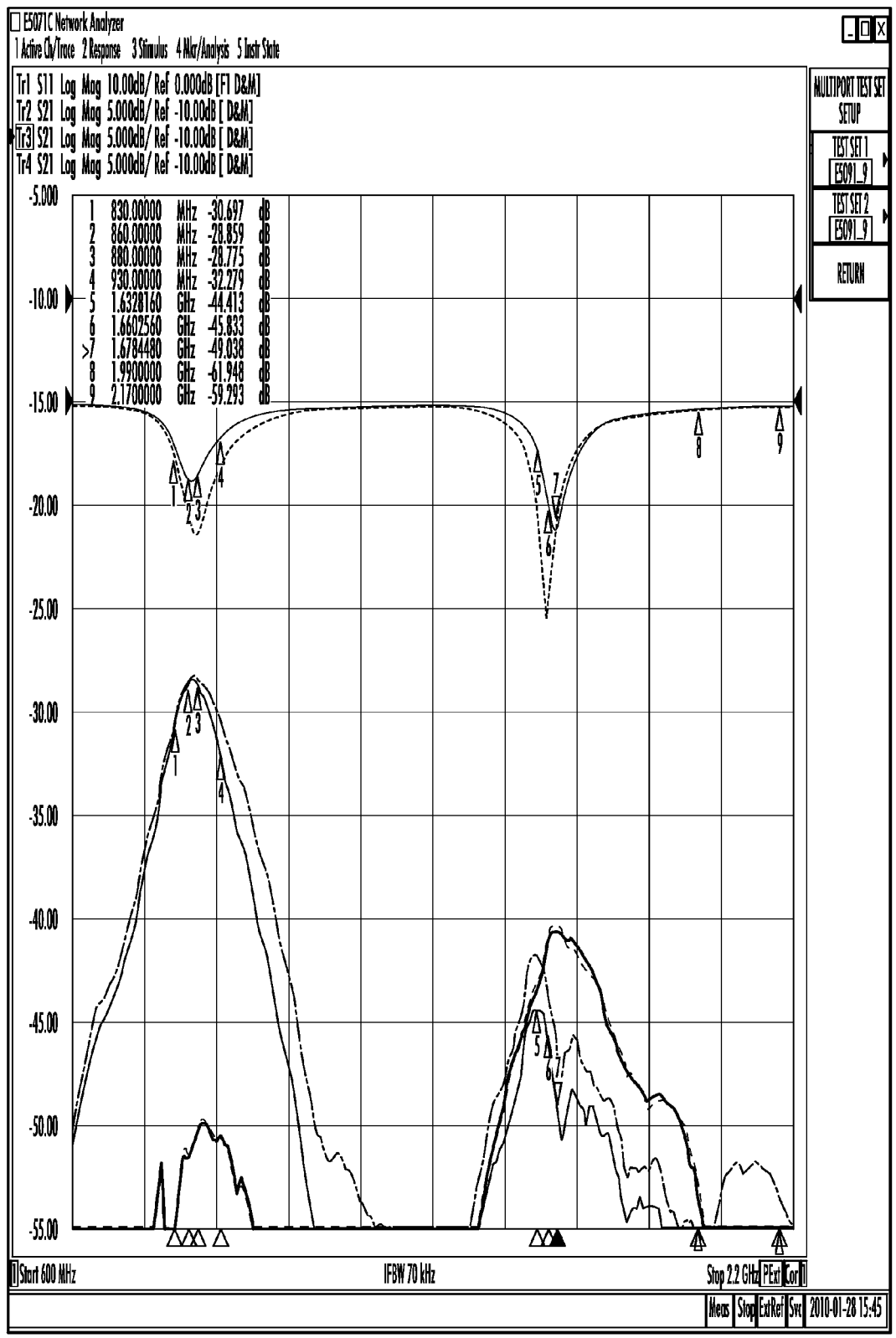
FIG. 7 is a graph showing measured return loss and transmission when the metallic ring is grounded in accordance with a non-limiting example.

To minimize the destructive resonances, in accordance with a non-limiting example, the metallic ring is grounded at locations where the current changes direction. The resulting current distribution for high frequency is shown in FIG. 6 and shows the finite element analysis with the computed vector current density on the chassis and the metallic ring grounded at three locations. Comparing this plot against the graph shown in FIG. 3B, it is possible to see that the current distribution of the chassis is not much closer to the case when the metallic ring is absent. This is confirmed in the measurement shown in the graph of FIG. 7 in which the destructive resonances are no longer present.

In accordance with a non-limiting example, when the metallic ring is floating (or isolated), a transmission line is created between the chassis and the ground. The currents in the ring and chassis will flow in opposite directions. Grounding the metallic ring creates a condition where the metallic ring and the chassis appear to be a single object electromagnetically. However, the grounding location is specific to the frequency of operation.

Figure 8:
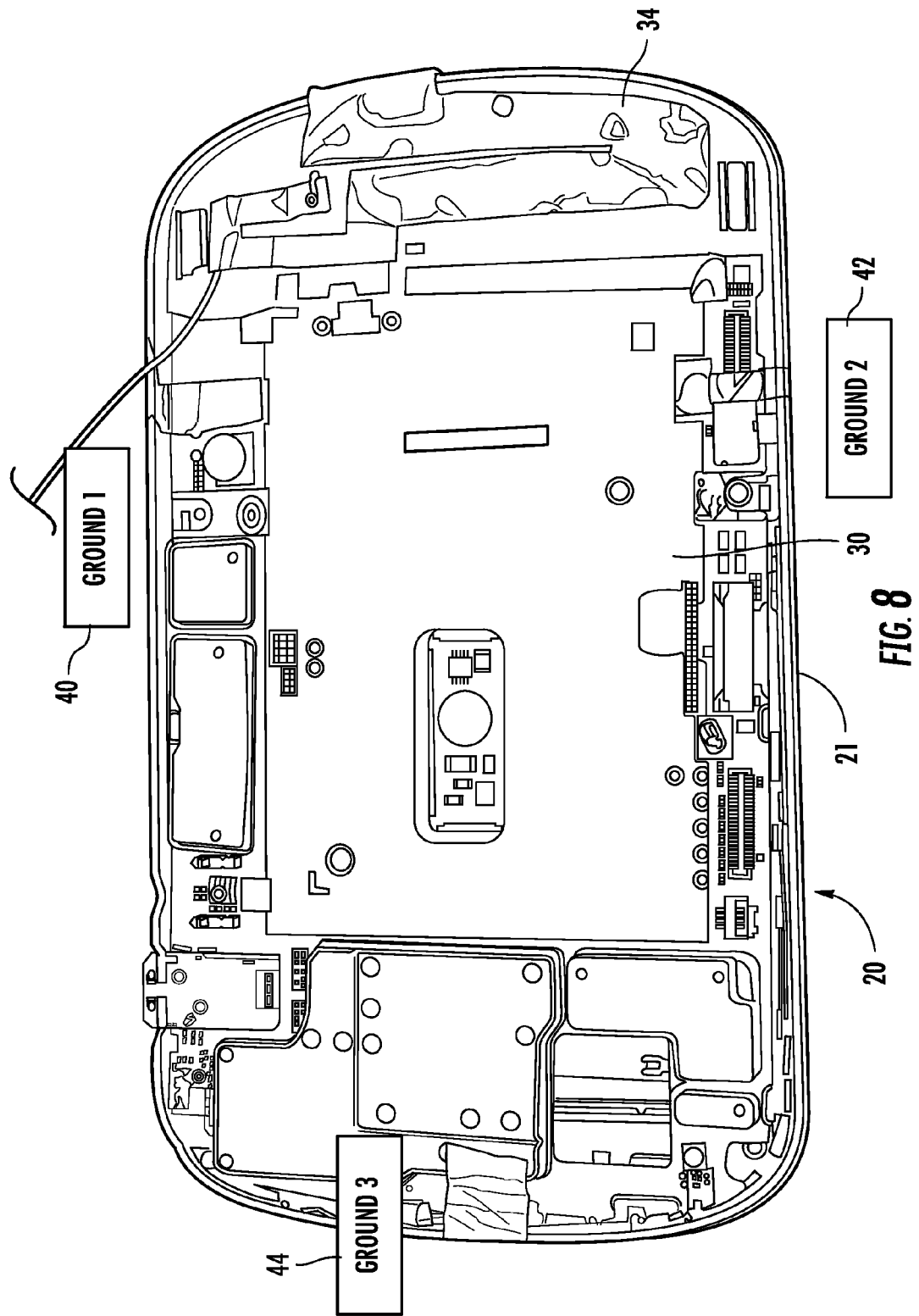
FIG. 8 is a plan view of a communications device with the cover removed and showing optimal grounding locations for the metallic ring in accordance with a non-limiting example.

FIG. 8 shows a plan view of a portable wireless communications device 20 with the chassis 30 and showing three frequency selective grounding circuits referred to as 40, 42, 44 ground locations in which ground 1 and ground 2 improve DCS performance, but decrease GSM850 slightly. In accordance with a non-limiting example, the grounding will respond to a specific range of frequencies using the frequency selective grounding circuit.

In one non-limiting example, this is achieved by making use of the harmonic trap instead of a 0 Ohm connection. The harmonic trap is a circuit or structure whereby the impedance is either nearly zero or nearly infinite at a given frequency or range of frequencies. For example, in the configuration shown in FIG. 8, ground 1 (40) and ground 2 (42) are used to inhibit the destructive interferences at high frequencies. As noted before, ground 1 and ground 2 cause slight destructive interferences at low frequencies. To achieve an optimal solution, in a non-limiting example, it is advantageous if ground 1 and ground 2 are electromagnetically transparent to the antenna at low frequencies. In one example, it is accomplished by replacing ground 1 and ground 2 with a series resonator that resonates at high frequencies only. The resonator could be formed by traces or discrete components, and could be formed in series or in parallel. This makes ground 1 and ground 2 exhibit a low impedance at high frequencies and a high impedance at low frequencies. As a result, low frequencies will not be able to flow through the resonator and avoid degradation that is otherwise introduced by a 0 Ohm connection.

In yet another example, a frequency selective grounding circuit is programmable and permits the ability to program the frequency response of the grounding. In a non-limiting example, the frequency selective grounding circuit includes a Variable Matching Device (VMD) in a front end chip set. More than one front end chip set can be used with multiple variable matching devices. In this example, a variable matching device as a device is incorporated into a harmonic trap or trace line in some instances at the ground location or adjacent, and offers a designer the opportunity to fine tune the exact frequency response of a grounding location. The variable matching device can be part of a chip set and allow impedance and/or capacitance to vary for grounding.

Figure 9:
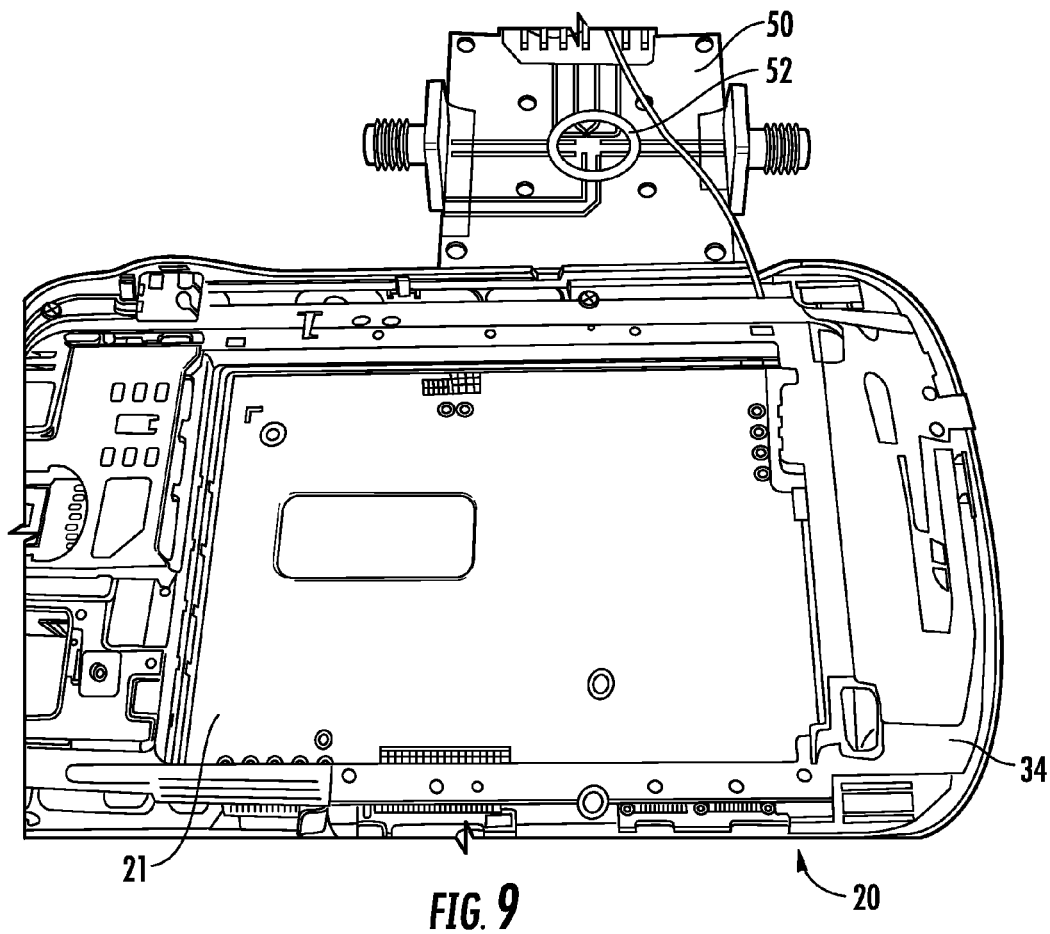
FIG. 9 is a perspective view showing a test set-up for the variable matching device, which is shown circled in red and showing its size relative to the chassis ground plane.

FIG. 9 shows a test set up 50 for testing the variable matching device and shows the size of the small variable matching device circled in the test set up at 52 relative to the size of other components in the device 20. This variable matching device can be incorporated at or near a grounding location.

Figure 10:
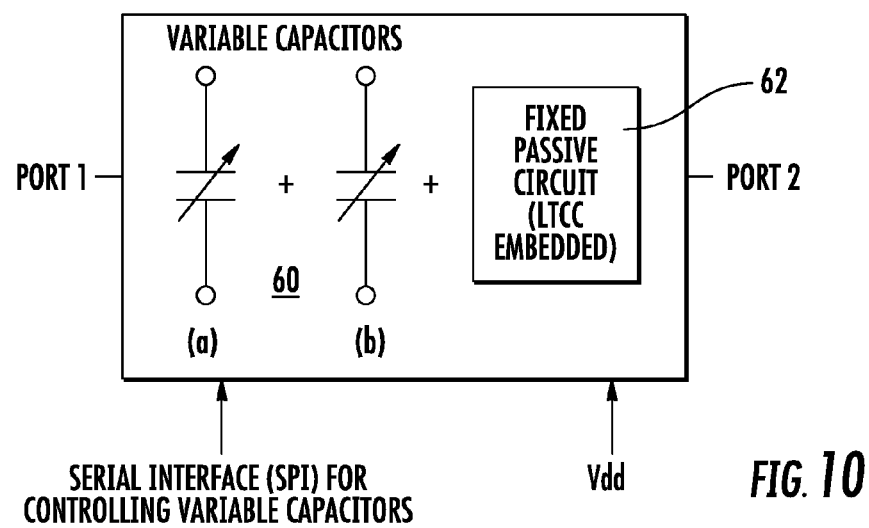
FIG. 10 is a schematic block diagram showing how the variable matching device changes impedance across various ports by programming a chip set in accordance with a non-limiting example.

FIG. 10 is a schematic block diagram showing variable capacitors 60 and a fixed passive circuit 62 that is LTCC embedded and showing the variable capacitors as connected to port 1 and through a fixed passive circuit through port 2 and the serial peripheral interface (SPI) for controlling the variable capacitors as part of the variable matching device. This permits the programming for grounding. This device changes the impedance across port 1 to port 2 by programming a chip set through the SPI port. The two variable capacitances (CA, CB) are used in the current evaluation.

Figure 11A:
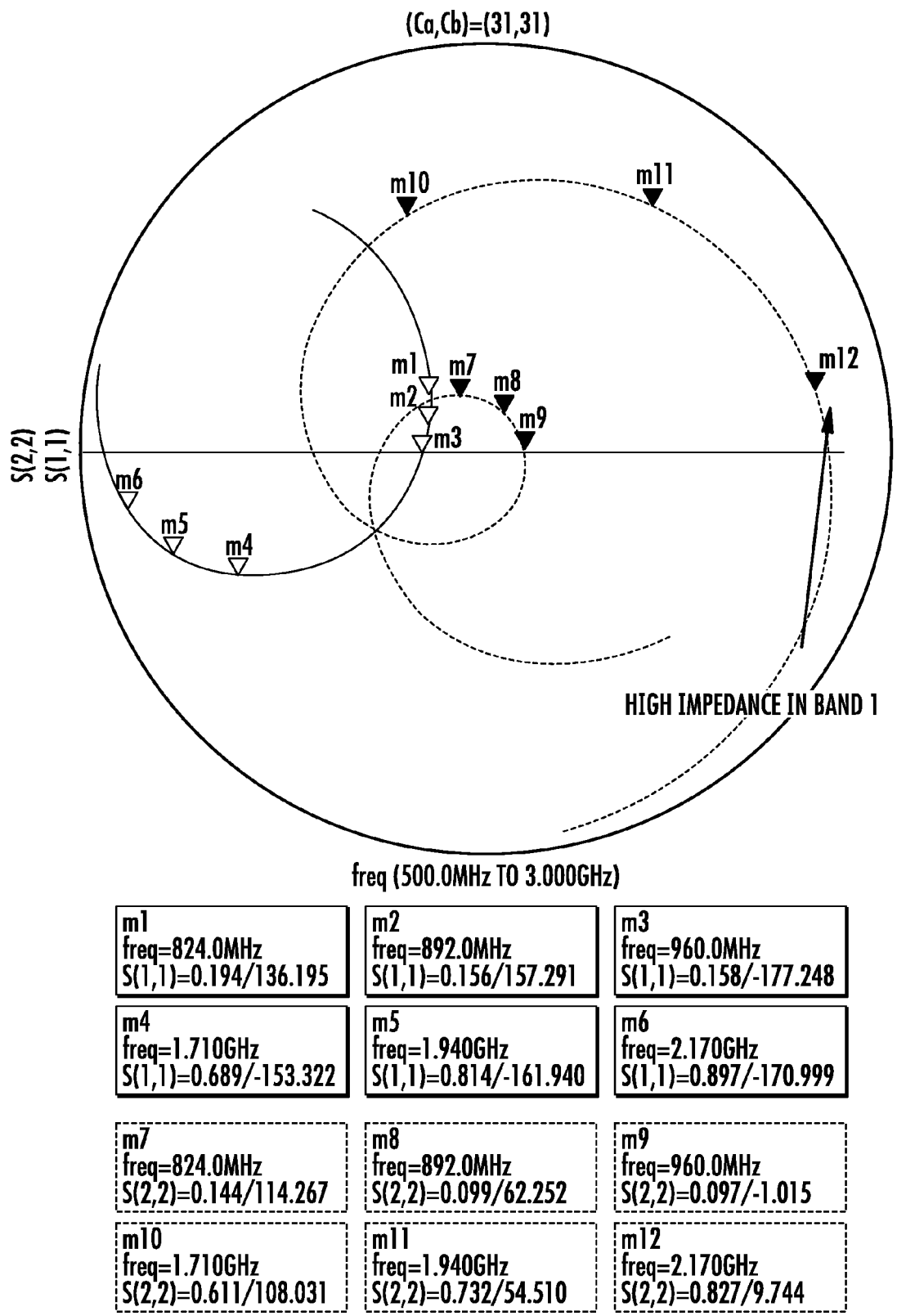
FIGS. 11A and 11B are graphs showing how by changing the value of capacitance (Cb) for the WCDMA band one a short or open condition is created.
Figure 11B:
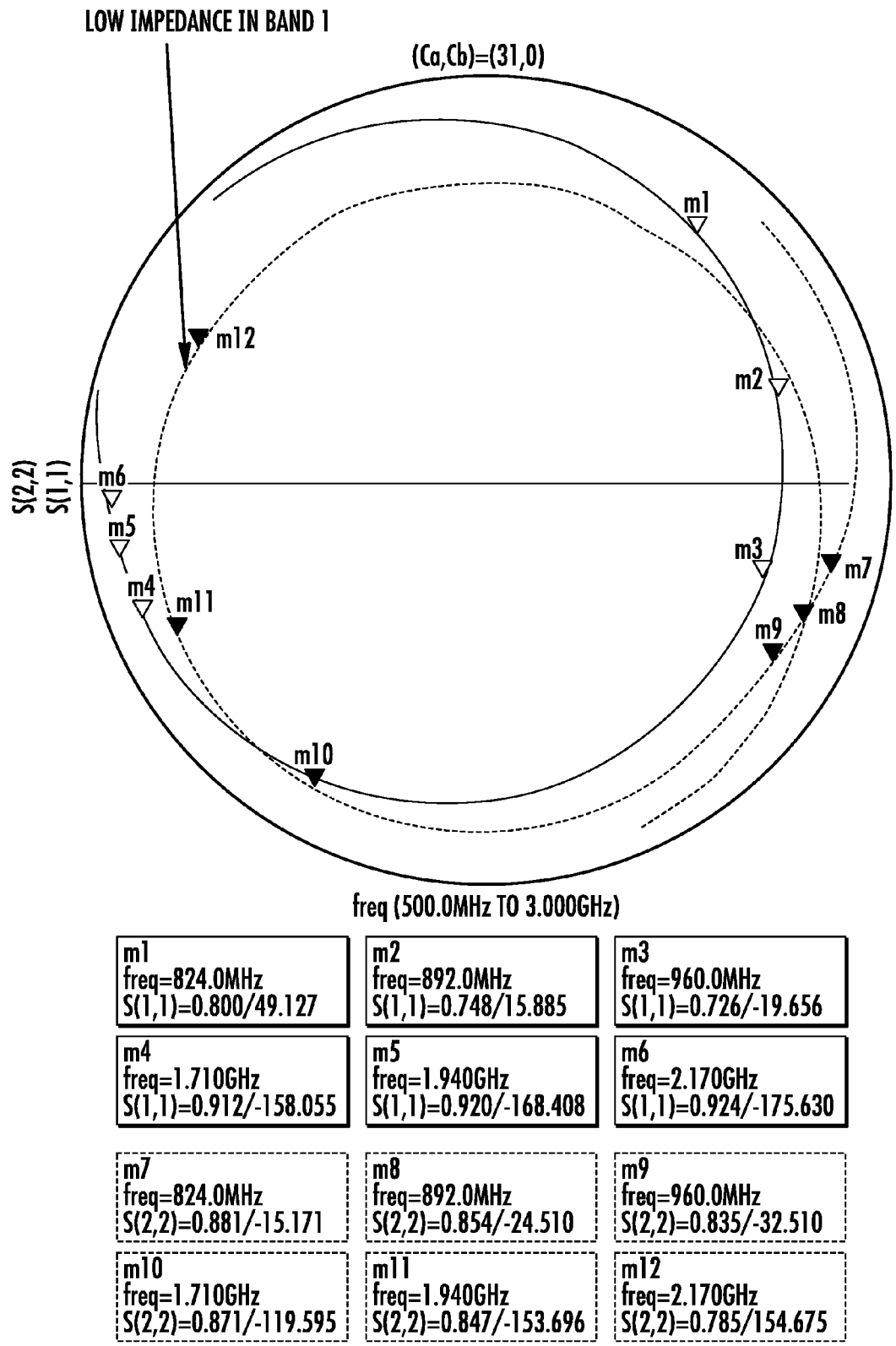

FIGS. 11A and 11B are graphs showing examples for the high impedance in band one (FIG. 11A) and the low impedance in band one (FIG. 11B) when changing the value of Cb for the WCDMA band one to create a short or open condition.

Figure 12:
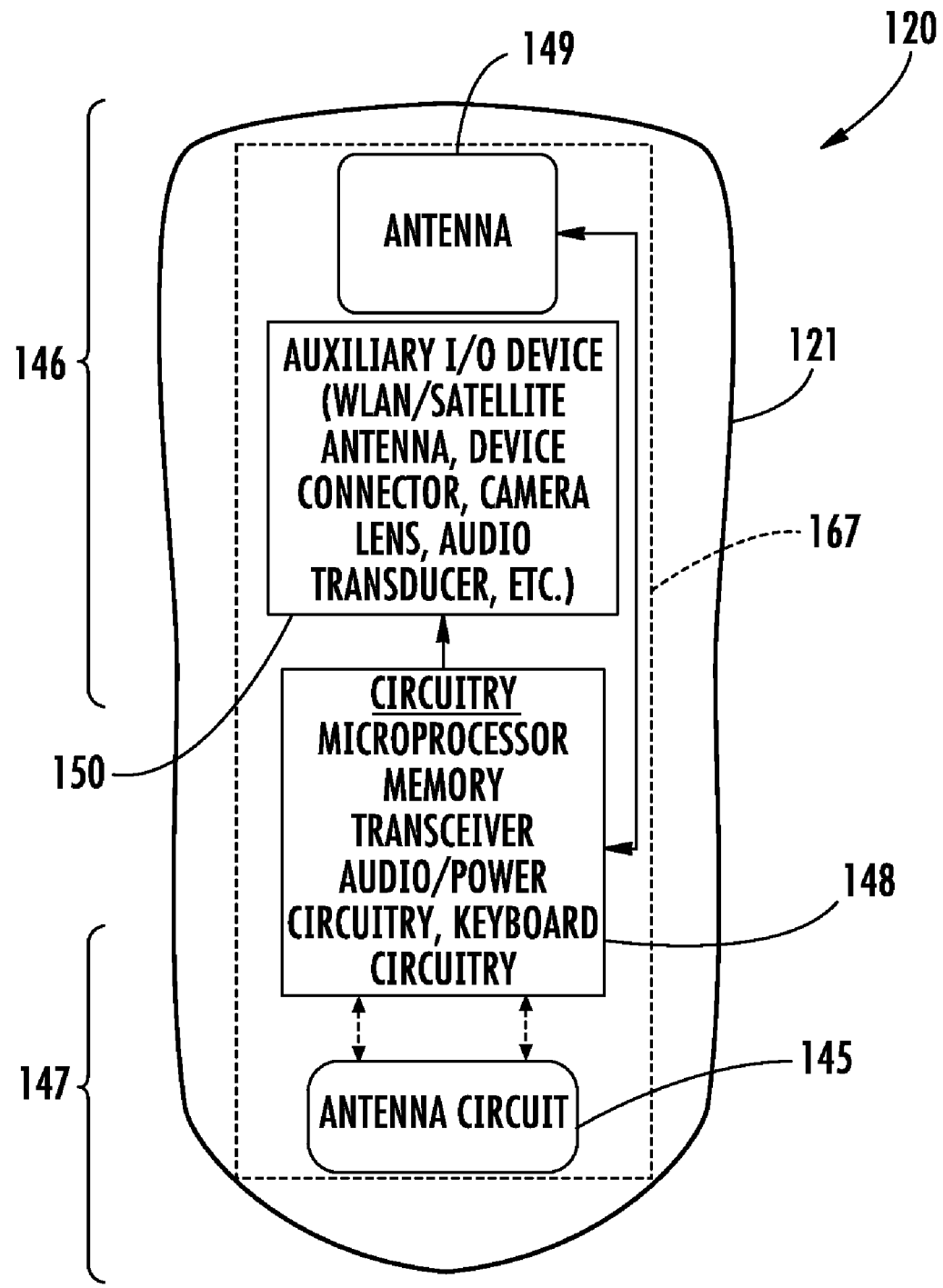
FIG. 12 is a schematic block diagram of an example of a mobile wireless communications device configured as a handheld device that can be used in accordance with non-limiting examples and illustrating basic internal components.
Figure 13:
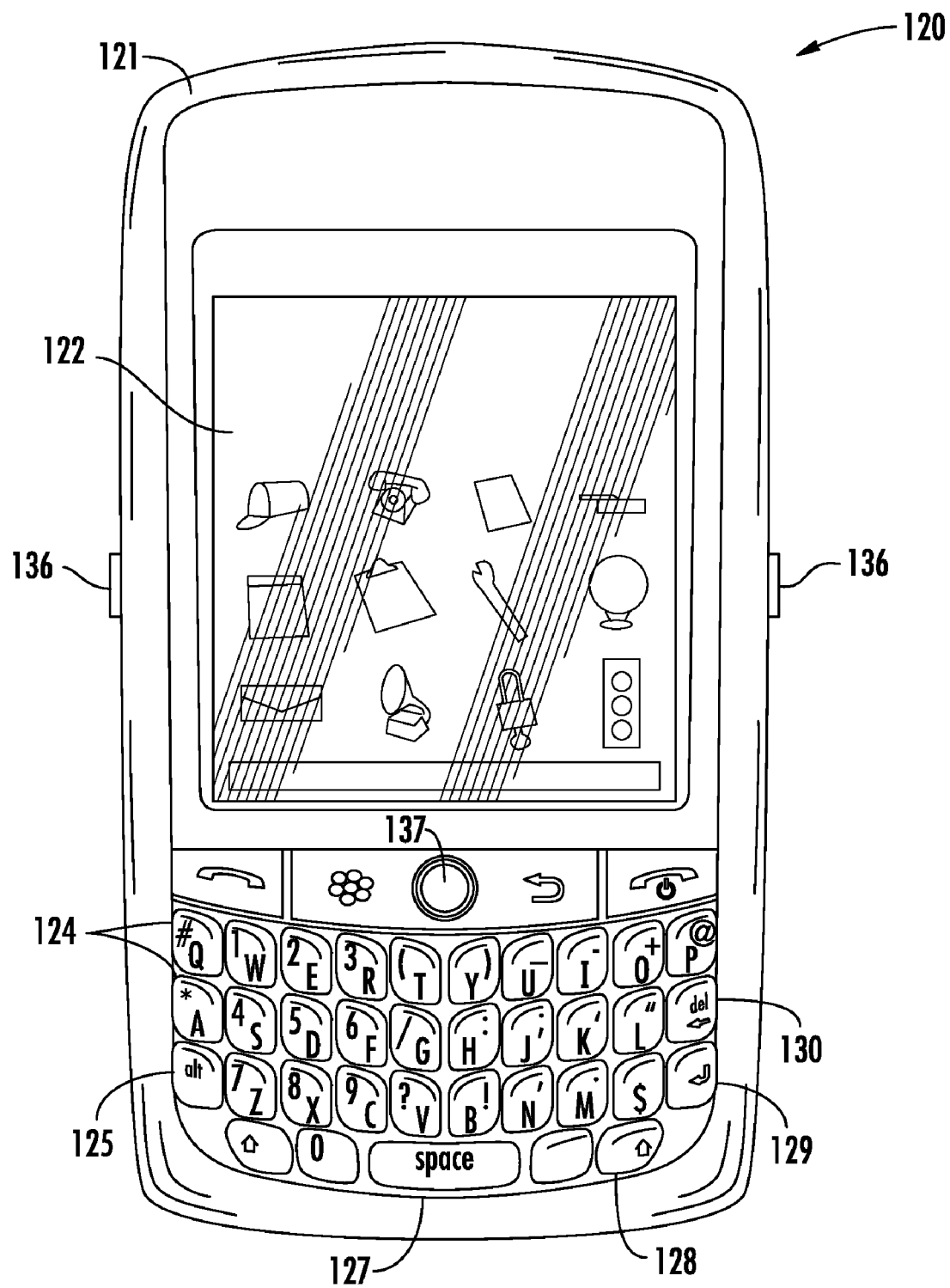
FIG. 13 is a front elevation view of the mobile wireless communications device of FIG. 12.
Figure 14:
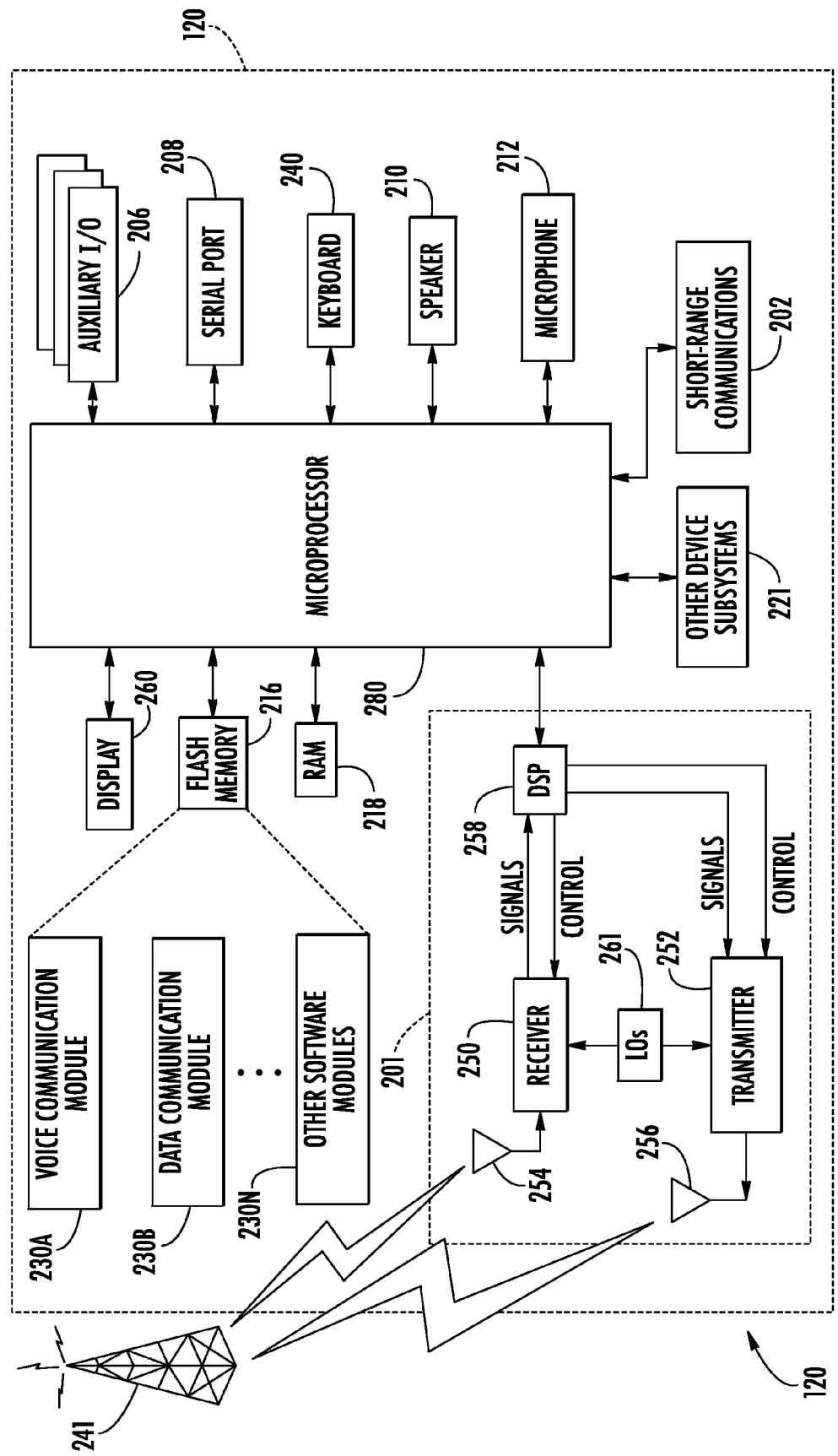
FIG. 14 is a schematic block diagram showing basic functional components that can be used in the mobile wireless communications device as described.

A brief description will now proceed relative to FIGS. 12-14, which disclose an example of a mobile wireless communications device, for example, a handheld portable cellular radio, which can incorporate as non-limiting examples the various circuits that can be used as described above. FIGS. 12-14 are representative non-limiting examples of the many different types of functional circuit components and their interconnection, and operative for use with the frequency selective grounding circuit.

Referring now to FIG. 12, an example of a mobile wireless communications device 120, such as a handheld portable cellular radio is described as an example mobile wireless communications device that can be used. This device 120 illustratively includes a housing 121 having an upper portion 146 and a lower portion 147, and a dielectric substrate (i.e., circuit board) 167, such as a conventional printed circuit board (PCB) substrate, for example, carried by the housing. A housing cover (not shown in detail) would typically cover the front portion of the housing. The term circuit board 167 as used hereinafter can refer to any dielectric substrate, PCB, ceramic substrate or other circuit carrying structure for carrying signal circuits and electronic components within the mobile wireless communications device 120. The illustrated housing 121 is a static housing, for example, as opposed to a flip or sliding housing, which is used in many cellular telephones. However, these and other housing configurations may also be used. In this example, the circuit board 167 is about the same size as the housing 121, and thus, a cable connecting the upper antenna and any switches 149 and antenna 145 at the lower end is not used.

Circuitry 148 is carried by the circuit board 167, such as a microprocessor, memory, one or more wireless transceivers (e.g., cellular, WLAN, etc.), which includes RF circuitry, including audio and power circuitry, including any keyboard circuitry. It should be understood that keyboard circuitry could be on a separate keyboard, etc., as will be appreciated by those skilled in the art. A battery (not shown) is also preferably carried by the housing 121 for supplying power to the circuitry 148. The term RF circuitry could encompass the interoperable RF transceiver circuitry, power circuitry and audio circuitry. The circuit board carries a main antenna 145 at the lower end of the housing and antenna 149 (such as a diversity antenna) at the upper end of the housing in this non-limiting example, although other configurations could be used.

Furthermore, an audio output transducer (e.g., a speaker) is carried by an upper portion 146 of the housing 121 and connected to the circuitry 148. One or more user input interface devices, such as a keypad (keyboard) 123 (FIG. 13), is also preferably carried by the housing 121 and connected to the circuitry 148. The term keypad 123 as used herein also refers to the term keyboard, indicating the user input devices having lettered and/or numbered keys commonly known and other embodiments, including multi-top or predictive entry modes. Other examples of user input interface devices include a track ball 137 and convenience keys 136, which could be positioned on the left and right sides of the housing. Of course, it will be appreciated that other user input interface devices (e.g., a stylus or touch screen interface) may be used in other embodiments. Also, other input interface devices could be used, for example, a mute/standby key, volume key or other menu. The housing could incorporate headset pads, USB ports, media card slots and other similar keys or inputs.

Antenna 145 is preferably positioned at the lower portion 147 in the housing (FIG. 12). Other antenna configurations can be used as non-limiting examples. In one non-limiting example, the antenna 145 could be formed on an antenna circuit board that extends from the main circuit board at the lower portion of the housing. Also, a separate keyboard circuit board could be used. Any separate antenna in some cases could be used and placed on a separate board and separated from each other. Other components could be placed on separate boards, for example, any transducers such as speakers and microphones could be mounted on separate boards. The antenna 149 is located away from the main antenna 145 in this example.

More particularly, a user will typically hold the upper portion of the housing 121 very close to his head so that any audio output transducer is directly next to his ear. Yet, the lower portion 147 of the housing 121 where an audio input transducer (i.e., microphone) is located need not be placed directly next to a user's mouth, and can be held away from the user's mouth. That is, holding the audio input transducer close to the user's mouth may not only be uncomfortable for the user, but it may also distort the user's voice in some circumstances.

Another important benefit of placing the antenna 145 adjacent the lower portion 147 of the housing 121 is that this may allow for less impact on antenna performance due to blockage by a user's hand. Users typically hold phones toward the middle to upper portion of the phone housing, and are therefore more likely to put their hands over such an antenna than they are an antenna mounted adjacent the lower portion 147 of the housing 121. Accordingly, more reliable performance may be achieved by placing the antenna 145 adjacent the lower portion 147 of the housing 121.

Still another benefit of this configuration is that it provides more room for one or more auxiliary input/output (I/O) devices 150 to be carried at the upper portion 146 of the housing. Furthermore, by separating the main antenna 145 from the auxiliary I/O device(s) 150, this may allow for reduced interference therebetween.

Examples of auxiliary I/O devices 150 could include another antenna besides a diversity antenna, such as a WiFi or WLAN (e.g., Bluetooth, IEEE 802.11) antenna for providing WLAN communication capabilities and/or a satellite positioning system (e.g., GPS, Galileo, etc.) antenna for providing position location capabilities, as will be appreciated by those skilled in the art. Other examples of auxiliary I/O devices 150 include a second audio output transducer (e.g., a speaker for speaker phone operation), and a camera lens for providing digital camera capabilities, an electrical device connector (e.g., USB, headphone, secure digital (SD) or memory card, etc.).

It should be noted that the term "input/output" as used herein for the auxiliary I/O device(s) 150 means that such devices may have input and/or output capabilities, and they need not provide both in all embodiments. That is, devices such as camera lenses may only receive an optical input, for example, while a headphone jack may only provide an audio output.

The device 120 further illustratively includes a display 122 (FIG. 13), for example, a liquid crystal display (LCD) carried by the housing 121 and connected to the circuitry 148 (FIG. 12). Convenience keys 136 and track ball 137 can also be connected to the circuitry 148 for allowing a user to navigate menus, text, etc., as will be appreciated by those skilled in the art. The track ball 137 may also be referred to as a "thumb wheel" or a "track wheel" in some instances and positioned in different locations. The keypad 123 illustratively includes a plurality of multi-symbol keys 124 each having indicia of a plurality of respective symbols thereon. The keypad 123 also illustratively includes an alternate function key 125, a space key 127, a shift key 128, a return (or enter) key 129, and a backspace/delete key 130.

Some keys could also be used to enter a "*" symbol upon first pressing or actuating the alternate function key 125. Similarly, the space key 127, shift key 128 and backspace key 130 could be used to enter a "0" and "#", respectively, upon first actuating the alternate function key 125 in some examples. The keypad 123 could include an escape key, an end or power key, and a convenience (i.e., menu) key for use in accessing an expanded home screen and placing cellular telephone calls. Many of these keys can be located in different positions.

Moreover, the symbols on each key 124 are arranged in top and bottom rows. The symbols in the bottom rows are entered when a user presses a key 124 without first pressing the alternate function key 125, while the top row symbols are entered by first pressing the alternate function key in this example keyboard. As seen in FIG. 13, the multi-symbol keys 124 are arranged in the rows on the keypad 123. Furthermore, the letter symbols on each of the keys 124 are arranged to define a QWERTY layout. That is, the letters on the keypad 123 are presented in a three-row format, with the letters of each row being in the same order and relative position as in a standard QWERTY keypad. Each row of keys can be arranged in columns.

Accordingly, the mobile wireless communications device 120 as described may advantageously be used not only as a traditional cellular phone, but it may also be conveniently used for sending and/or receiving data over a cellular or other network, such as Internet and email data, for example. Of course, other keypad configurations may also be used in other embodiments. Multi-tap or predictive entry modes may be used for typing e-mails, etc. as will be appreciated by those skilled in the art.

Different antenna can operate together as a multi-frequency band antenna system, which provides enhanced transmission and reception characteristics over multiple operating frequencies. More particularly, the antennae are designed to provide high gain, desired impedance matching, and meet applicable SAR requirements over a relatively wide bandwidth and multiple frequency bands such as different cellular frequency bands. For example, the antennae can operate over five bands, for example, a 850 MHz Global System for Mobile Communications (GSM) band (GSM 850), a 900 MHz GSM band, a DCS band, a PCS band, and a WCDMA band (i.e., up to about 2100 MHz) (or CDMA 850/1900), although it may be used for other bands/frequencies as well as noted above. To conserve space, a main antenna may advantageously be implemented in three dimensions although it may be implemented in two-dimensional or planar embodiments as well.

The mobile wireless communications device shown in FIGS. 12 and 13 can incorporate e-mail and messaging accounts and provide different functions such as composing e-mail, PIN messages, and SMS messages. The device can manage messages through an appropriate menu that can be retrieved by choosing a messages icon. An address book function could add contacts, allow management of an address book, set address book options and manage SIM card phone books. A phone menu could allow for the making and answering of phone calls using different phone features, managing phone call logs, setting phone options, and viewing phone information. A browser application could permit the browsing of web pages, configuring a browser, adding bookmarks, and changing browser options. Other applications could include a task, memo pad, calculator, alarm and games, as well as handheld options with various references.

A calendar icon can be chosen for entering a calendar program that can be used for establishing and managing events such as meetings or appointments. The calendar program could be any type of messaging or appointment/meeting program that allows an organizer to establish an event, for example, an appointment or meeting.

A non-limiting example of various functional components that can be used in the exemplary mobile wireless communications device 120 is further described in the example below with reference to FIG. 14. The device 120 illustratively includes a housing 220, a keypad 240 and an output device 260. The output device 260 shown is preferably a display, which is preferably a full graphic LCD. Other types of output devices may alternatively be used. A processing device 280 is contained within the housing 220 and is coupled between the keypad 240 and the display 260. The processing device 280 controls the operation of the display 260, as well as the overall operation of the mobile device 120, in response to actuation of keys on the keypad 240 by the user.

The housing 220 may be elongated vertically, or may take on other sizes and shapes (including clamshell housing structures). The keypad may include a mode selection key, or other hardware or software for switching between text entry and telephony entry.

In addition to the processing device 280, other parts of the mobile device 120 are shown schematically in FIG. 14. These include a communications subsystem 201; a short-range communications subsystem 202; the keypad 240 and the display 260, along with other input/output devices 206, 208, 210 and 212; as well as memory devices 216, 218 and various other device subsystems 221. The mobile device 120 is preferably a two-way RF communications device having voice and data communications capabilities. In addition, the mobile device 120 preferably has the capability to communicate with other computer systems via the Internet.

Operating system software executed by the processing device 280 is preferably stored in a persistent store, such as the flash memory 216, but may be stored in other types of memory devices, such as a read only memory (ROM) or similar storage element. In addition, system software, specific device applications, or parts thereof, may be temporarily loaded into a volatile store, such as the random access memory (RAM) 218. Communications signals received by the mobile device may also be stored in the RAM 218.

The processing device 280, in addition to its operating system functions, enables execution of software applications 230A-230N on the device 120. A predetermined set of applications that control basic device operations, such as data and voice communications 230A and 230B, may be installed on the device 120 during manufacture. In addition, a personal information manager (PIM) application may be installed during manufacture. The PIM is preferably capable of organizing and managing data items, such as e-mail, calendar events, voice mails, appointments, and task items. The PIM application is also preferably capable of sending and receiving data items via a wireless network 241. Preferably, the PIM data items are seamlessly integrated, synchronized and updated via the wireless network 241 with the device user's corresponding data items stored or associated with a host computer system.

Communication functions, including data and voice communications, are performed through the communications subsystem 201, and possibly through the short-range communications subsystem. The communications subsystem 201 includes a receiver 250, a transmitter 252, and one or more antennae 254 and 256. In addition, the communications subsystem 201 also includes a processing module, such as a digital signal processor (DSP) 258, and local oscillators (LOs) 261. The specific design and implementation of the communications subsystem 201 is dependent upon the communications network in which the mobile device 120 is intended to operate. For example, the mobile device 120 may include a communications subsystem 201 designed to operate with the Mobitex™, Data TAC™ or General Packet Radio Service (GPRS) mobile data communications networks, and also designed to operate with any of a variety of voice communications networks, such as AMPS, TDMA, CDMA, PCS, GSM, etc. Other types of data and voice networks, both separate and integrated, may also be utilized with the mobile device 120.

Network access requirements vary depending upon the type of communication system. For example, in the Mobitex and DataTAC networks, mobile devices are registered on the network using a unique personal identification number or PIN associated with each device. In GPRS networks, however, network access is associated with a subscriber or user of a device. A GPRS device therefore requires a subscriber identity module, commonly referred to as a SIM card, in order to operate on a GPRS network.

When required network registration or activation procedures have been completed, the mobile device 120 may send and receive communications signals over the communication network 241. Signals received from the communications network 241 by the antenna 254 are routed to the receiver 250, which provides for signal amplification, frequency down conversion, filtering, channel selection, etc., and may also provide analog to digital conversion. Analog-to-digital conversion of the received signal allows the DSP 258 to perform more complex communications functions, such as demodulation and decoding. In a similar manner, signals to be transmitted to the network 241 are processed (e.g., modulated and encoded) by the DSP 258 and are then provided to the transmitter 252 for digital to analog conversion, frequency up conversion, filtering, amplification and transmission to the communication network 241 (or networks) via the antenna 256.

In addition to processing communications signals, the DSP 258 provides for control of the receiver 250 and the transmitter 252. For example, gains applied to communications signals in the receiver 250 and transmitter 252 may be adaptively controlled through automatic gain control algorithms implemented in the DSP 258.

In a data communications mode, a received signal, such as a text message or web page download, is processed by the communications subsystem 201 and is input to the processing device 280. The received signal is then further processed by the processing device 280 for an output to the display 260, or alternatively to some other auxiliary I/O device 206. A device user may also compose data items, such as e-mail messages, using the keypad 240 and/or some other auxiliary I/O device 206, such as a touchpad, a rocker switch, a thumb-wheel, or some other type of input device. The composed data items may then be transmitted over the communications network 241 via the communications subsystem 201.

In a voice communications mode, overall operation of the device is substantially similar to the data communications mode, except that received signals are output to a speaker 210, and signals for transmission are generated by a microphone 212. Alternative voice or audio I/O subsystems, such as a voice message recording subsystem, may also be implemented on the device 120. In addition, the display 260 may also be utilized in voice communications mode, for example to display the identity of a calling party, the duration of a voice call, or other voice call related information.

Any short-range communications subsystem enables communication between the mobile device 120 and other proximate systems or devices, which need not necessarily be similar devices. For example, the short-range communications subsystem may include an infrared device and associated circuits and components, or a Bluetooth™ communications module to provide for communication with similarly-enabled systems and devices.

It should be understood that GSM is one type of preferred communications system and uses a radio interface that can have an uplink frequency band and downlink frequency band with about 25 MHz bandwidth, typically subdivided into 124 carrier frequency channels, each spaced about 200 KHz apart as non-limiting examples. Time division multiplexing can be used to allow about 8 speech channels per radio frequency channel, giving 8 radio time slots and 8 burst periods grouped into what is called a TDMA frame. For example, a channel data rate could be about 270.833 Kbps and a frame duration of about 4.615 milliseconds (MS) in one non-limiting example. The power output can vary from about 1 to about 2 watts.

Linear predictive coding (LPC) can also be used to reduce the bit rate and provide parameters for a filter to mimic a vocal track with speech encoded at about 13 Kbps. Four different cell sizes can be used in a GSM network, including macro, micro, pico and umbrella cells. A base station antenna can be installed on a master building above the average rooftop level in a macrocell. In a macrocell, the antenna height can be under the average rooftop level and used in urban areas. Microcells typically have a diameter of about a few dozen meters and are used indoors. Umbrella cells can cover shadowed regions or smaller cells. Typically, the longest distance for the GSM specification covered by an antenna is about 22 miles depending on antenna height, gain and propagation conditions.

GSM systems typically include a base station subsystem, a network and switching subsystem, and a General Packet Radio Service (GPRS) core network. A subscriber identify module (SIM) is usually implemented in the communications device, for example, the well known SIM card, similar to a smart card containing the subscription information and phone book of a user. The user can also switch handsets or could change operators by changing a SIM.

The GSM signaling protocol has three general layers. Layer 1 is a physical layer using channel structures above the air interface. Layer 2 is the data link layer. Layer 3 is a signaling protocol, which includes three sublayers. These include a Radio Resources Management sublayer to control the setup, maintenance and termination of radio and fixed channels, including handovers. A Mobility Management sublayer manages the location updating and registration procedures and secures the authentication. A Connection Management sublayer handles general call control and manages supplementary services and the short message service. Signaling between different entities such as the Home Location Register (HLR) and Visiting Location Register (VLR) can be accomplished through a Mobile Application Part (MAP) built upon the Transaction Capabilities Application Part (TCAP) of the top layer of the Signaling System No. 7.

A Radio Resources Management (RRM) sublayer can oversee the radio and fixed link establishment between the mobile station and an MSE.

It is also possible to used Enhanced Data Rates for GSM Evolution (EDGE), as an enhancement to General Packet Radio Service (GPRS) networks. EDGE can use 8 Phase Shift Keying (8 PSK) and Gaussian Minimum Shift Keying (GMSK) for different modulation and coding schemes. A three-bit word can be produced for every changing carrier phase. A rate adaptation algorithm can adapt the Modulation and Coding Scheme (MCS) according to the quality of the radio channel and the bit rate and robustness of data transmission. Base stations are typically modified for EDGE use.

Many modifications and other embodiments will come to the mind of one skilled in the art having the benefit of the teachings presented in the foregoing descriptions and the associated drawings. Therefore, it is understood that the disclosure is not to be limited to the specific embodiments disclosed, and that modifications and embodiments are intended to be included within the scope of the appended claims.

That which is claimed is:

1. A mobile wireless communications device, comprising:
a portable housing having a metallic front housing configured as a peripheral side wall and forming a metallic ring;
at least one circuit board carried by the portable housing and forming a chassis ground plane wherein the metallic ring is peripheral to and surrounds the circuit board;
a wireless communication circuit carried by a circuit board;
an antenna circuit carried by a circuit board and connected to the wireless communication circuit; and
a frequency selective grounding circuit positioned at a selected grounding location between the chassis grounding plane and metallic ring at a location where the current changes direction and forming a harmonic trap that responds to a specific range of frequencies.

2. The mobile wireless communications device according to claim 1, wherein a respective frequency selective grounding circuit operates at a specific range of frequencies.

3. The mobile wireless communications device according to claim 1, wherein a respective frequency selective grounding circuit comprises at least one of a series resonator and parallel resonator having a value depending on bandwidth requirements.

4. The mobile wireless communications device according to claim 3, and further comprising a series resonator that resonates at high frequencies.

5. The mobile wireless communications device according to claim 1, wherein a grounding location is specific to the frequency of operation.

6. The mobile wireless communications device according to claim 1, wherein a frequency selective grounding circuit has a programmable frequency response for grounding.

7. The mobile wireless communications device according to claim 6, wherein a frequency selective grounding circuit comprises a variable matching device.

8. The mobile wireless communications device according to claim 1, wherein said antenna comprises a planar inverted F antenna.

9. The mobile wireless communications device according to claim 1, wherein said wireless communications circuit comprises a cellular communications circuit.

10. The mobile wireless communications device according to claim 1, and further comprising a display and user input device both carried by the portable housing and connected to said wireless communication circuit.

11. A mobile wireless communications device, comprising:
a portable housing having a metallic front housing configured as a peripheral side wall and forming a metallic ring;
at least one circuit board carried by the portable housing and forming a chassis ground plane wherein the metallic ring is peripheral to and surrounds the circuit board;
a wireless communication circuit carried by a circuit board;
an antenna circuit carried by a circuit board and connected to the wireless communication circuit; and
a frequency selective grounding circuit positioned at a selected grounding location between the chassis grounding plane and metallic ring at a location where the current changes direction and forming a harmonic trap that responds to a specific range of frequencies, wherein the frequency selective grounding circuit comprises a variable matching device in which the frequency response of grounding is programmed.

12. The mobile wireless communications device according to claim 11, wherein a respective variable matching device is programmed to operate at a specific range of frequencies.

13. The mobile wireless communications device according to claim 11, wherein a variable matching device is configured to change the impedance at a grounding location.

14. The mobile wireless communications device according to claim 11, wherein a grounding location is specific to the frequency of operation.

15. The mobile wireless communications device according to claim 11, wherein said antenna comprises a planar inverted F antenna.

16. The mobile wireless communications device according to claim 11, wherein said wireless communications circuit comprises a cellular communications circuit.

17. The mobile wireless communications device according to claim 11, and further comprising a display and user input device both carried by the portable housing and connected to said wireless communication circuit.

18. A method of operating a mobile wireless communications device, wherein the device comprises a portable housing having a metallic front housing configured as a peripheral side wall and forming a metallic ring of the portable housing, at least one circuit board carried by the portable housing and forming a chassis ground plane wherein the metallic ring is peripheral to and surrounds the circuit board, a wireless communication circuit carried by a circuit board, and an antenna circuit carried by a circuit board and connected to the wireless communication circuit; and forming harmonic traps by positioning a frequency selective grounding circuit between a selected grounding location at the chassis grounding plane and metallic ring at a location where the current changes direction that responds to a specific range of frequencies.

19. The method according to claim 18, and further comprising operating a respective frequency selective grounding circuit at a specific range of frequencies.

20. The method according to claim 18, wherein a respective frequency selective grounding circuit comprises at least one of a series resonator and parallel resonator having a value depending on bandwidth requirements.

21. The method according to claim 18, and wherein a frequency selective grounding circuit comprises a series resonator that resonates at high frequencies.

22. The method according to claim 18, wherein a grounding location is specific to the frequency of operation.

23. The method according to claim 18, wherein said frequency selective grounding circuit has a programmable frequency response for grounding.

24. The method according to claim 18, wherein a frequency selective grounding circuit comprises a variable matching device.

* * * * *